Patented Feb. 12, 1952

2,585,651

UNITED STATES PATENT OFFICE 2,585,651

MODIFIED STARCH PRODUCT

Walter H. Hart, Winnetka, Ill.

No Drawing. Application March 2, 1949,
Serial No. 79,321

8 Claims. (Cl. 127—33)

This invention relates to new and useful starch containing compositions and to a new and improved method for the manufacture thereof.

One of the objects of the invention is to produce new and useful modified starch containing compositions in which the starch is substantially undegraded but when cooked with water exhibits properties different from those obtained from the raw or untreated starchy material.

A further object is to provide a new and improved method of producing starch containing compositions which is characterized by unusual simplicity.

Another object of the invention is to provide a new and improved method of treating starch containing flours in order to modify the starchy component thereof as previously described while avoiding the difficulties that frequently arise where the flour contains a protein component.

Another object of the invention is to prepare a modified starch containing composition from low grade flours to obtain a solid product which can be readily handled and stored.

Still a further object of the invention is to provide a method of treating starch containing flours to produce a product in which the starchy component is uniformly modified.

An additional object of the invention is to produce a new and improved modified starch containing product which is particularly well adapted for the manufacture of gypsum, wall board or other gypsum products where starchy components or dextrins have heretofore been employed. Other objects will appear hereinafter.

In accordance with the invention it has been found that the starchy components of starch containing flours can be modified quite simply and easily by intimately mixing (e. g., either by physically mixing or by milling) the starch containing flour with a small amount of aluminum chloride.

This is preferably accomplished by milling the starch containing flour with the aluminum chloride in a hammer mill or other suitable milling machine. During the milling operation some heat is generated and loss of some moisture occurs. Tests of the resultant product have shown that the starchy component is modified by reaction with the aluminum chloride.

The quantity of the aluminum chloride may vary within the range of 0.1 to 2% by weight of said flour but is preferably within the range of 0.5 to 2% and optimum results have been obtained with 0.75%.

The time required for intimately mixing the aluminum chloride with the starch containing flour in order to bring about the desired reaction may vary depending upon the quantities of the materials employed, the type of mixing and the particle sizes.

In a typical thousand pound batch of starch containing flour approximately one-half hour is required in order to obtain uniform mixing and reaction of the aluminum chloride with the flour by physically mixing in a Day mixer. In a continuous mixer such as a hammer mill where the starch containing flour and the aluminum chloride are fed through proportioning devices continuously, the mixing of the aluminum chloride is practically instantaneous.

Heating is not required during the mixing. The temperature brought about by the mixing will vary depending upon the type of mixing and the amount of aluminum chloride used.

Samples of products prepared in accordance with the invention have been tested in the following manner:

To 40 grams of sample at room temperature 90 cc. of water were added at 2 degrees C. The resultant product was mixed in a Waring blender for one minute. The temperature was then near 20 degrees C. The viscosity was determined immediately on a CV viscosity pipette. It was observed that products prepared in accordance with the present invention had a viscosity of at least 50 seconds. Where the product was milled, the viscosity was around 65 seconds. The same product to which no aluminum chloride had been added had a viscosity of 32 seconds to 35 seconds. It was also noted that the reducing sugars content of the products was around 50% to 75% higher than the reducing sugars content of the untreated flour.

In another viscosity test 10 gram samples of (1) an untreated flour, (2) a flour mixed with aluminum chloride only, and (3) a flour mixed with aluminum chloride and milled, were added to 100, 150 and 200 cc. of water, respectively, and brought to a boil. Heating was discontinued and the viscosity run at once on a CV viscosity pipette at 95 degrees C. After standing at room temperature over night the viscosity at room temperature was determined. The following results were noted:

| | | Immediate Viscosity at 95° C. | After 16 hours Viscosity at room temperature |
|---|---|---|---|
| 1 | 10 gr. plus 100 cc. H₂O | Semi gel | Semi gel. |
| | 10 gr. plus 150 cc. H₂O | 81 sec | Do. |
| | 10 gr. plus 200 cc. H₂O | 22 sec | 150 sec. |
| 2 | 10 gr. plus 100 cc. H₂O | 44 sec | Too thick to flow from pipette. |
| | 10 gr. plus 150 cc. H₂O | 19 sec | Do. |
| | 10 gr. plus 200 cc. H₂O | 14 sec | 103 sec. |
| 3 | 10 gr. plus 100 cc. H₂O | 24 sec | 125 sec. |
| | 10 gr. plus 150 cc. H₂O | 14 sec | 32 sec. |
| | 10 gr. plus 200 cc. H₂O | 12 sec | 20 sec. |

It will be observed that the products derived by mixing the aluminum chloride with the starch containing flour were much thinner than the untreated flour when subjected to the foregoing viscosity tests after treatment at boiling temperatures.

The invention is especially suitable for the preparation of products from milo maize or milo flour which is a sorghum containing 75% to 80% starch. The invention is also applicable to any starch containing flour including corn, wheat, rye, oats, barley, sorghum and ground tapioca roots.

One feature of the invention is that the products are especially useful in the manufacture of gypsum board or other gypsum products. The products have the advantage that they are substantially free from sodium chloride, calcium chloride and other plasticizers that are deleterious to gypsum. The gypsum is calcined and incorporated with a slurry of heavy foam made from saponin or other foaming materials and a cooked starch-aluminum chloride product of the character herein described. The products herein described are fully as effective and more advantageous in some respects than other types of starch products heretofore employed for this purpose.

The term "cooked" as used herein with respect to the products of the invention means heated with water until the modified starch granule bursts.

The invention is hereby claimed as follows:

1. The solid product consisting essentially of an intimate mixture of a starch containing flour having a starch content not substantially in excess of 80% by weight and 0.1 to 2% by weight of said flour of aluminum chloride, said mixture being obtained by mixing the said flour with said aluminum chloride in the solid state under conditions facilitating the generation of heat and loss of moisture, the reducing sugars content of the resultant product being substantially higher than that of the untreated flour, the product having a viscosity when dispersed in water at 20° C. substantially higher than that of the untreated flour and the product having a viscosity when cooked with water substantially lower than that of the untreated flour.

2. The solid product consisting essentially of an intimate mixture of a starch containing flour having a starch content not substantially in excess of 80% by weight and approximately 0.75% by weight of said flour of aluminum chloride, said mixture being obtained by mixing the said flour with said aluminum chloride in the solid state under conditions facilitating the generation of heat and loss of moisture, the reducing sugars content of the resultant product being substantially higher than that of the untreated flour, the product having a viscosity when dispersed in water at 20° C. substantially higher than that of the untreated flour and the product having a viscosity when cooked with water substantially lower than that of the untreated flour.

3. The solid product consisting essentially of an intimate mixture of a sorghum flour and 0.5 to 2% by weight of said flour of aluminum chloride, said mixture being obtained by mixing the said flour with said aluminum chloride in the solid state under conditions facilitating the generation of heat and loss of moisture, the reducing sugars content of the resultant product being substantially higher than that of the untreated flour, the product having a viscosity when dispersed in water at 20° C. substantially higher than that of the untreated flour and the product having a viscosity when cooked with water substantially lower than that of the untreated flour.

4. The solid product consisting essentially of an intimate mixture of milo flour and 0.5 to 2% by weight of said flour of aluminum chloride, said mixture being obtained by mixing the said flour with said aluminum chloride in the solid state under conditions facilitating the generation of heat and loss of moisture, the reducing sugars content of the resultant product being substantially higher than that of the untreated flour, the product having a viscosity when dispersed in water at 20° C. substantially higher than that of the untreated flour and the product having a viscosity when cooked with water substantially lower than that of the untreated flour.

5. A method of producing a normally solid product which comprises mixing in the solid state a starch-containing flour having a starch content not substantially in excess of 80% by weight and 0.1 to 2% by weight of said flour of aluminum chloride under conditions facilitating the generation of heat and the loss of moisture until a product is obtained wherein the reducing sugars content is substantially increased, the viscosity of the product dispersed in water at 20° C. is substantially increased and the viscosity of the product when cooked with water is substantially decreased as compared with the original untreated flour.

6. A method of producing a normally solid product which comprises mixing in the solid state a starch-containing flour having a starch content not substantially in excess of 80% by weight and approximately 0.75% weight of said flour of aluminum chloride under conditions facilitating the generation of heat and the loss of moisture until a product is obtained wherein the reducing sugars content is substantially increased, the viscosity of the product dispersed in water at 20° C. is substantially increased and the viscosity of the product when cooked with water is substantially decreased as compared with the original untreated flour.

7. A method of producing a normally solid product which comprises mixing in the solid state a sorghum flour having a starch content not substantially in excess of 80% by weight and 0.5 to 2% by weight of said flour of aluminum chloride under conditions facilitating the generation of heat and the loss of moisture until a product is obtained wherein the reducing sugars content is substantially increased, the viscosity of the product when dispersed in water at 20° C. is substantially increased and the viscosity of the product when cooked with water is substantially decreased as compared with the original untreated flour.

8. A method of producing a normally solid product which comprises mixing in the solid state a milo flour having a starch content not substantially in excess of 80% by weight and 0.5 to 2% by weight of said flour of aluminum chloride under conditions facilitating the generation of heat and the loss of moisture until a product is obtained wherein the reducing sugars content is substantially increased, the viscosity of the product when dispersed in water at 20° C. is substantially increased and the viscosity of the product when cooked with water is substantially decreased as compared with the original untreated flour.

WALTER H. HART.

REFERENCES CITED

The following references are of record in the file of this patent:

UNITED STATES PATENTS

| Number | Name | Date |
|---|---|---|
| 536,260 | Bloede | Mar. 26, 1895 |
| 1,284,495 | Tunnell | Nov. 12, 1918 |
| 2,212,557 | Bauer | Aug. 27, 1940 |
| 2,503,053 | Kerr | Apr. 4, 1950 |

FOREIGN PATENTS

| Number | Country | Date |
|---|---|---|
| 25,121 | Great Britain | of 1909 |

OTHER REFERENCES

Radley, "Starch and Its Derivatives," 2d. ed., N. Y., 1944, pp. 261-263.

Walton, "Comp. Survey of Starch Chem.," pp. 175-178.

Courtonne, Comptes rendus (Paris) 1920, tome 171, pp. 1168-1170.